Sept. 11, 1956     M. S. ROSENBERGER     2,762,384
GOVERNOR FOR HYDRAULICALLY CONTROLLED AUTOMATIC TRANSMISSION
Filed Nov. 22, 1952     2 Sheets-Sheet 1

INVENTOR
Maurice S. Rosenberger
BY
Willits, Helwig & Baillio
ATTORNEYS

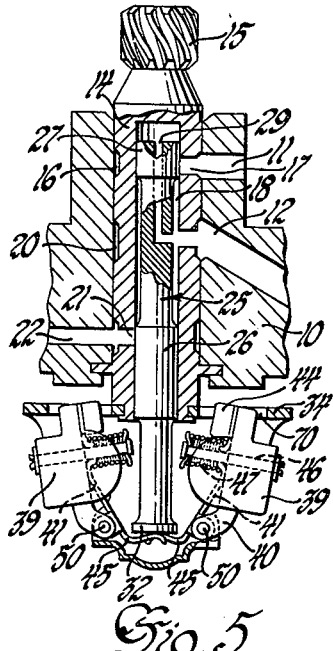
Fig. 5
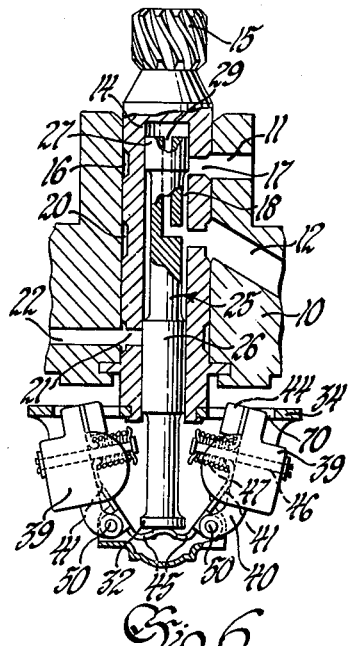
Fig. 6
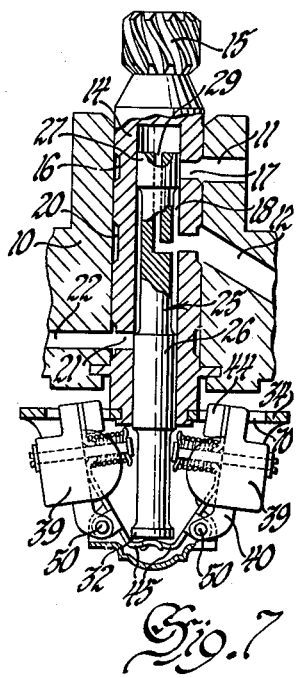
Fig. 7
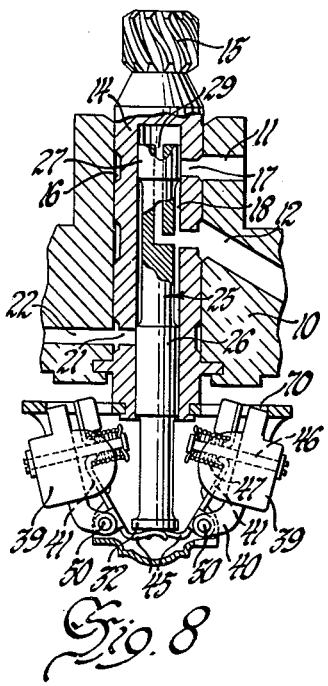
Fig. 8
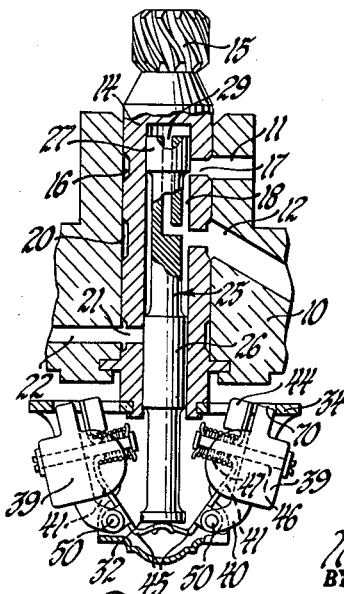
Fig. 9
Fig. 10
INVENTOR.
Maurice S. Rosenberger
BY Willits, Helwig & Baillio
ATTORNEY

United States Patent Office 2,762,384
Patented Sept. 11, 1956

2,762,384

GOVERNOR FOR HYDRAULICALLY CONTROLLED AUTOMATIC TRANSMISSION

Maurice S. Rosenberger, Birmingham, Mich., assignor to General Motors Corporation, Detroit, Mich., a corporation of Delaware Application November 22, 1952, Serial No. 322,106

12 Claims. (Cl. 137—51)

This invention relates to governors and more particularly to governors used in connection with, and for, controlling operating characteristics of hydraulically operated automatic transmissions.

The governor of the present invention is a two-stage governor and is an improvement on that shown and described in the co-pending application of Oliver K. Kelley and Robert S. Plexico, S. N. 291,692, filed June 4, 1952, for Transmission Control System. The improvement is for the purpose of making possible increase in hydraulic pressure which is regulated by the governor and, in so doing, to make possible the most efficient utilization of the flyweight mechanism employed in accomplishing regulation.

A governor incorporating the improvements of this invention consists briefly of a ported casing having mounted for rotation therein a ported sleeve, within which is slidably mounted a valve member. A flyweight mechanism is connected to one end of the sleeve for coaction with the valve member in such fashion that the pressure of liquid delivered from the governor to a control line can be regulated in accordance with speed of rotation of the sleeve which is in direct proportion to the speed of rotation of the output shaft of the transmission and, hence, in direct proportion to vehicle speed. The flyweight mechanism comprises one or more units, each made up of a pivoted weighted lever and a pivoted weight of substantially greater mass than the total weight of the lever and its weight, so connected by yielding means that limited separation of the lever and the weight is permitted under certain operating conditions. The unit is mounted in such fashion that, as the sleeve rotates, centrifugal force acts to move the unit outwardly with the weight leading the lever and with the lever having a finger engaging the valve to determine the position of the valve in the sleeve in accordance with the position of the unit under centrifugal force. Outward movement of the weight is arrested by a stop formed on the support for the unit, and the weight itself when arrested serves as a stop for arresting outward movement of the lever. The yielding means connecting the weight and the lever is so biased that, under ordinary operating conditions, the weight and lever move outwardly in unison and in contact during an initial part of the first stage of operation, after which pressure developed in the valve and applied to the finger of the lever can cause limited separation of the lever from the weight to a degree determined by the strength of the yielding means and the variable force exerted by the weight of the lever under the influence of centrifugal force.

The manner in which the advantages of the invention are obtained will be apparent from the following detailed description of the accompanying drawings, in which—

Figure 1:
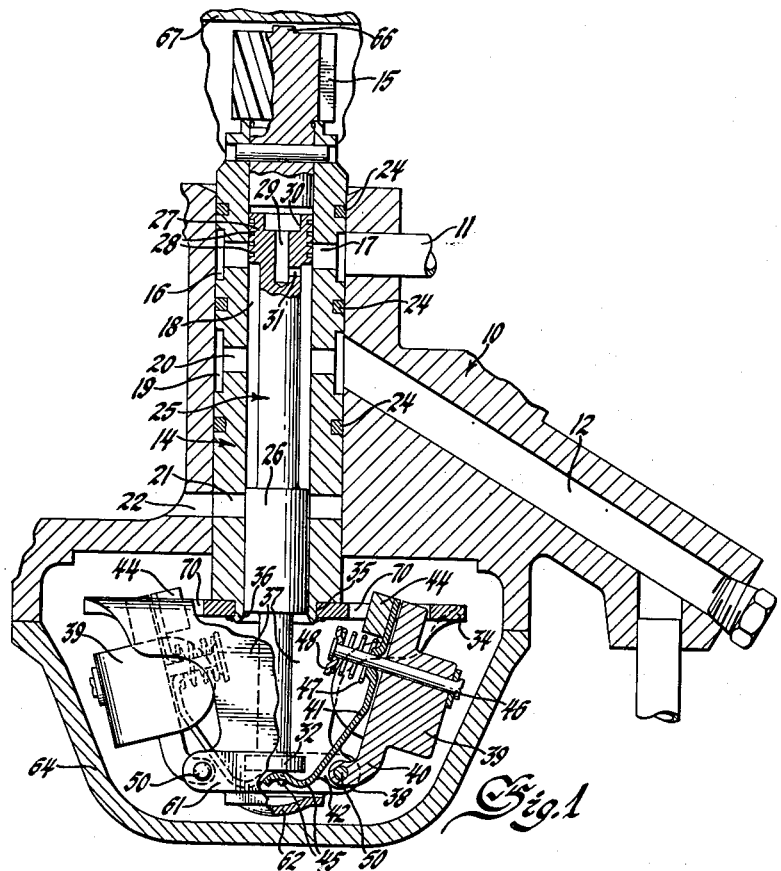
Fig. 1 is a view partially in section of a governor embodying the invention.
Figure 2:
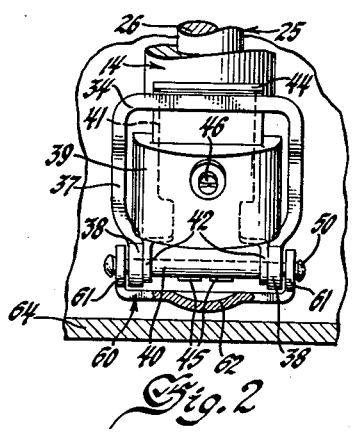
Fig. 2 is a side view of the flyweight mechanism employed in the invention.

Referring now to the drawings and particularly to Figs. 1 and 2, 10 indicates generally a casing having a port or opening therein, to which is connected an inlet conduit 11 and a second port or opening to which is connected an outlet conduit 12 leading to a control line associated with operating parts of an automatic transmission, as has been shown more clearly in the co-pending application before identified. Rotatably mounted within the bore provided by the casing 10 is a sleeve 14. This sleeve has secured to one end thereof a spiral gear 15 to mesh with a gear on the output shaft of the transmission in the customary manner. Sleeve 14 is provided with an annular peripheral groove 16 in communication with diametrically opposite orifices 17 which, in turn, communicate with the hollow interior or bore 18 of the sleeve. Groove 16, and, hence, orifice 17 are in register with the inlet opening 11. A second peripheral groove 19 is in communication with diametrically opposite orifices 20 which, in turn, are in communication with the bore 18; the groove 19 and orifices 20 being in register with the outlet opening or passage 12. The sleeve is also provided with orifices 21 in communication with an outlet opening 22 in the casing which leads to exhaust. The sleeve also has a plurality of peripheral grooves in which are mounted oil rings 24.

Slidably mounted in the bore 18 of the sleeve is a rod-like valve member 25 having a land 26 intermediate the ends thereof and having a terminal land 27 provided with a plurality of peripheral grooves 28. These grooves insure good lubrication of the land to prevent it from binding in the sleeve. One end of the valve member is bored as at 29 and counterbored as at 30, the latter being in communication with a radial passage 31. The other end of the valve is provided with an enlargement or button 32.

Secured to the end of the sleeve opposite the gear 15 is a support for a flyweight mechanism. The support is made up of a radially extending flat portion 34 having a central opening 35 through which passes a reduced part 36 of the sleeve; such reduced part being staked or brazed to the portion 34. The part 34 has opposite wings 37 of configuration shown in Figs. 1 and 2, with the outer end parts thereof having lobes 38.

In the particular flyweight mechanism shown use is made of two units. Each unit comprises a weight member 39 having an angular extension 40 and a lever 41 having spaced ears 42. The lever also has secured thereto in any suitable fashion such as by welding, riveting, etc., a weight 44. The end of the lever opposite weight 44 is shaped into a finger 45.

The weight 39 and the lever 41 are effectively connected by a headed rod 46 passing through openings in each member, with the end opposite the head staked to prevent separation of the parts. A spring 47 is captive between the lever and dished washer 48, engaged by the head of the rod, for normally holding the lever in contact with a part of the weight. The weight and the lever are pivotally mounted on the housing by means of a pin or rivet 50 which passes through the lobes 38, through the ears 42 of the lever, and through the angular portion 40 of the weight. Thus it will be seen that the weight and the lever are mounted for limited individual pivotal motion about the pin 50, such independence of motion being limited by the yielding means, i. e., spring 47 and rod 46 which connect the parts together. When they are so mounted the finger 45 of the lever is in position to engage the outer surface of the button 32 on the end of valve 25 with a minimum of friction.

Figure 3:
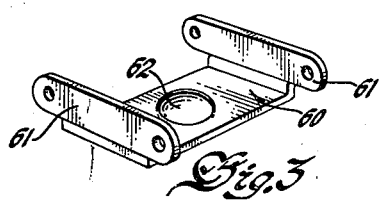
Fig. 3 is a perspective view of a thrust bearing member mounted in the flyweight mechanism.

While the description so far has been limited to one unit of the flyweight mechanism, the other unit thereof is of identical construction. In addition to the two units being pivotally mounted between wings of the supporting member, the same pins or rivets 50 which are used for this mounting also serve to retain a thrust bearing cap 60 in assembly with the support. It will be obvious from Fig. 3 that the parallel parts 61 of this member 60 have spaced openings through which the pins or rivets 50 may pass. When so positioned on the support, the outer surface of indentation 62 is spaced a short distance from the inner surface of casing cap 64 which can be secured to the casing 10 in any suitable manner. The purpose of this thrust bearing cap 60 as well as a thrust bearing extension 66 on the other end of the sleeve assembly will be discussed later. By reference to Fig. 1 it will be noted that the bearing member 66 is in close proximity to a part 67 which may be a fixed portion of the same casing 10 or may be a fragment of the housing for the transmission with which the governor is associated.

The operation of the governor, just described, is substantially as follows. Let it be assumed that oil is delivered to the governor from a suitable source, such as a pump, through the inlet conduit 11, which delivery customarily takes place only when the governor is rotating. The pump may be driven by the same output shaft that drives the gear 15, or may be driven by any other suitable source of power. As soon as the transmission is put into such operation as to cause the output shaft thereof to rotate, this rotation will be communicated to the sleeve 14 through the spiral gear 15. Rotation of sleeve 14 causes centrifugal force to be effective immediately upon the pair of flyweight units tending to rotate the unhinged ends thereof outwardly relative to the valve 25. Outward movement of the flyweight elements causes movement of valve 25 toward the gear 15 until the lower end of land 27 clears the portion 17 in communication with the inlet conduit 11. Oil from this inlet may pass into the bore of the sleeve and out therefrom through ports 20 and the outlet conduit 12, to be delivered to a control line extending to operating parts of the transmission. As soon as the pressure of oil delivered to the control line begins to rise, oil within the sleeve bore will pass through port 31 into the bore 29 and the counterbore 30, at which point it begins to exert a force tending to move the valve 25 downwardly, as viewed in Fig. 1. Such downward motion applies a force through the fingers 45 of the levers which tends to draw the unhinged ends of the levers 41 and the weights 39 inwardly toward the valve against centrifugal force. If the pressure developed in the control line reaches a point at which the force exerted by the oil against the end of the valve is greater than the force exerted on the other end of the valve by centrifugal force acting on the flyweights and through them to the valve, the valve can move to a position at which land 26 opens the orifices or ports 21 sufficiently to permit oil to escape from the bore of the sleeve through the exhaust port 22, thereby reducing the pressure developed in the control line. This regulating action causes the valve to reciprocate or "hunt" and units to swing or "flutter" on their axes of pivotal movement.

In the preferred operation of this governor, the respective weights and levers are held in contact with each other during an initial part of the first stage of governor operation. It will be noted from Fig. 1 that the unhinged ends of the units extend into windows 70 in the support parts 34 and that the path of movement is such that the weight is limited in its outward progress. For this reason the action of the governor over a predetermined initial part of the first stage is such that each unit has its unhinged end moved outwardly by centrifugal force with the parts of the unit held together. During this initial part of the first stage of operation the action has been that of a regulating valve which serves to exhaust excess pressure oil from the sleeve while permitting the pressure developed to increase as a function of increased speed of rotation of the sleeve and the flyweight mechanism compelled to rotate therewith. The two stages of regulation by the governor will be more apparent by reference to Figs. 5 to 7 inclusive for low vehicle speed operation, and Figs. 8 to 10 inclusive for high vehicle speed operation. Fig. 5 shows the governor regulator valve in a condition of balanced forces during low vehicle speed. In other words, the centrifugal force applied to the lower end of the valve member 25 is balanced by the hydraulic force applied to the upper end of land 27 of the valve and this upper end is in communication by passage 29 with the delivery line 12. In this condition of balanced forces and at low vehicle speed, it will be seen that the two weights 39 and 44 are held together by the spring 47. The two weights, of course, are mounted on the spindle 50 for separate rotation thereabout whenever conditions permit.

Fig. 6 illustrates the condition occurring when vehicle speed increases the centrifugal force applied on the lower end of the valve member 25 by the combined weights 39 and 44 being moved outwardly about the spindle 50 with their force exerted through the fingers 45 on the member 32 on the lower end of valve 25. This increased centrifugal force causes valve 25 to be moved upwardly permitting land 27 thereof to open the port 17 connected to the line 11 from the pump supplying oil to the governor regulator valve. The oil from the pump then immediately enters the bore of the valve and passes therefrom through the port connected to the delivery line 12 and to whatever part of the mechanism subjected to regulated governor pressure. At the same time oil passes through the channel 29 into the space or chamber at the top of the land 27 of valve 25. Pressure in the delivery line 12 and equal pressure in the chamber at the top of the valve will rise as the volume of oil supplied to the delivery line increases.

Fig. 7 illustrates the condition that occurs when the pressure in the delivery line as reflected in the chamber at the top of land 27 exceeds the centrifugal force applied to the lower end of the valve 25 by the two weights 39 and 44. When this oil pressure is higher than the centrifugal force, valve 25 is moved downwardly so that land 27 closes the port 17 and the land 26 opens the port 21 to exhaust passage 22 permitting oil in the delivery line 12 and the chamber at the top of the valve to be exhausted. When sufficient oil has been exhausted to reduce the hydraulic pressure to equality with centrifugal force as exerted on the valve, the valve will be restored to the Fig. 5 condition.

It will be noted in each of Figs. 5, 6 and 7 that the two weights 39 and 44 are held together by the spring 47 and rotate in unison about the axis of the spindle 50. The foregoing description has been related to one-half of the weight mechanism but it will be evident that both halves function in the same manner and simultaneously.

Figure 4:
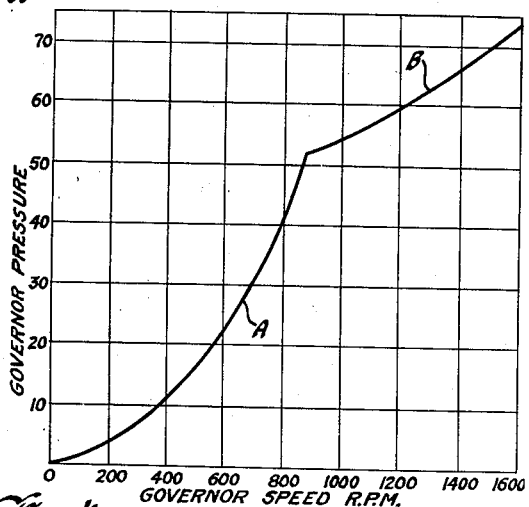
Fig. 4 is a graph showing the relation of pressure to governor speed in the two stages of operation thereof, Figs. 5 to 7 inclusive illustrate the regulating action of the governor at low speed, and Figs. 8 to 10 inclusive illustrate the regulating action of the governor at high speed.

This type of regulating action will occur over the entire low speed range with a delivered pressure of the nature illustrated by the curve A of Fig. 4 of the drawings.

When the vehicle speed exceeds predetermined value, centrifugal force acting on the weight 39 will be high enough to cause the upper end thereof to come to rest against the stop 34. However, such halting of the movement of the weight 39 does not prevent the rotation of weight 44 about its axis since this weight 44 can be moved inwardly against the tension of spring 47 as is illustrated in Fig. 8. This figure shows the valve 25 in the same condition as Fig. 5 with the hydraulic force on the upper end of the valve being balanced by centrifugal force on the lower end of the valve. The latter force is a combination of that exerted by the larger weight 44 through the spring 47 on the smaller weight 44 and the centrifugal force on this weight 44 itself. Weight 44, therefore, under this balanced condition of pressures is separated from weight 61 as permitted by compression of spring 47.

As the speed of the vehicle increases, the centrifugal force of weight 44, augmented by the force of the stationary weight 39 and spring 47, will raise the valve 25 to a position corresponding to that of Fig. 6. Oil then is admitted to the bore of the valve from the pump and is conducted to the delivery line 12 and to the chamber at the top of land 27 in the manner previously described. It will be noted that the weight 44 has moved closer to weight 39 than in Fig. 8.

When the delivered pressure rises sufficiently high, the effect thereof in the chamber at the top of land 27 will be to move the valve member 25 downwardly so that land 26 opens the exhaust port 21 in the same manner as in Fig. 7. This downward movement of valve 58 causes the weight 44 to be moved inwardly relative to either the Fig. 8 or Fig. 9 position further compressing spring 47. As soon as sufficient oil is exhausted through the channel 75 to reduce the effective pressure in the delivery line, the parts will again assume the Fig. 8 condition balancing delivered pressure against exerted centrifugal force. Increased speed of the vehicle with resultant increase in centrifugal force acting on the small weights 44 will require higher delivery pressure to move the valve to the exhaust condition. The delivered pressure, therefore, increases in accordance with curve B of Fig. 4 of the drawing.

In both stages of operation of the governor regulator valve this valve reciprocates between a position opening the port to the delivery line and a state of equilibrium or, if necessary, to a position opening the port to the exhaust line. In the first stage the two weights act together whereas in the second stage the larger weight has its centrifugal force added to that of the smaller weight through the spring 47 with the final result that in the second stage considerable higher delivered pressure is necessary for the regulating action of the valve than is true in the first stage.

If the spiral gear 15 is rotated in such a direction as to tend to move the sleeve longitudinally away from cap 64, such motion is arrested by the thrust bearing member 66 contacting the fixed part 67. However, if there be present some other force, such as a hydraulic force acting to move the sleeve longitudinally toward the cap 64, this movement is limited by the indentation 62 of the cap 60 engaging the inner surface of the cap 64. Thus any force tending to move the sleeve in either direction longitudinally is effectively limited so that the sleeve is maintained in proper alignment with the ports in the casing and its operation is not seriously affected.

From the foregoing it will be seen that the present invention provides a governor for use in connection with hydraulically controlled automatic transmissions in which the mass of the weights are utilized to the fullest advantage for obtaining the desired regulation in the governor of the developed oil pressure in a control line or at any operated part of the mechanism. It is to understood that the invention can be modified beyond the illustrated embodiment and, hence, any limits to be imposed thereupon are only those set forth in the following claims.

What is claimed is:

1. A governor for delivering a variable pressure from a fluid pressure supply line to a control line comprising a casing, a pressure determining valve in said casing operative to deliver a variable pressure from said supply line to said control line, a flyweight mechanism adapted to be rotated at a variable speed on an axis concentric with the axis of said valve and comprising a support, a weighted lever pivotally secured to said support, a weight pivotally secured to said support, means normally holding said lever and weight together, said means being yieldable for limited separation of said lever and said weight, whereby parts of said lever and said weight may move outwardly under centrifugal force with said weight leading said lever, said lever being arranged to apply a force to said valve to move said valve toward a position to increase the pressure delivered to said control line with rise in speed of rotation of said flyweight mechanism, and a pressure chamber in said casing subject to pressure in said control line for applying to said valve a force opposing the force applied to said valve by said flyweight mechanism.

2. A governor for delivering a variable pressure from a fluid pressure supply line to a control line comprising a casing, a pressure determining valve in said casing operative to deliver a variable pressure from said supply line to said control line, a flyweight mechanism adapted to be rotated at a variable speed on an axis concentric with the axis of said valve and comprising a support, a weighted lever pivotally secured to said support, a weight pivotally secured to said support, means normally holding said lever and weight together, said means being yieldable for limited separation of said lever and said weight, whereby parts of said lever and said weight may move outwardly under centrifugal force with said weight leading said lever, a stop for arresting outward movement of said weight, said weight when arrested serving as a stop to arrest outward movement of said lever, said lever being arranged to apply a force to said valve to move said valve toward a position to increase the pressure delivered to said control line with rise in speed of rotation of said flyweight mechanism, and a pressure chamber in said casing subject to pressure in said control line for applying to said valve a force opposing the force applied to said valve by said flyweight mechanism.

3. A governor for delivering a variable pressure from a fluid pressure supply line to a control line comprising a casing, a pressure determining valve in said casing operative to deliver a variable pressure from said supply line to said control line, a flyweight mechanism adapted to be rotated at a variable speed on an axis concentric with the axis of said valve and comprising a support, a weighted lever pivotally secured to said support, a weight pivotally secured to said support, means normally holding said lever and weight together, said means being yieldable for limited separation of said lever and said weight, whereby parts of said lever and said weight may move outwardly under centrifugal force with said weight leading said lever, said lever being arranged to apply a force to said valve to move said valve toward a position to increase the pressure delivered to said control line with rise in speed of rotation of said flyweight mechanism, and a pressure chamber in said casing subject to pressure in said control line for applying to said valve a counter force opposing the force applied to said valve by said flyweight mechanism, said counter force being operative during a part of the range of rotation of said mechanism to cause separation of said weight and said lever.

4. A governor for delivering a variable pressure from a fluid pressure supply line to a control line comprising a casing, a pressure determining valve in said casing operative to deliver a variable pressure from said supply line to said control line, a flyweight mechanism adapted to be rotated at a variable speed on an axis concentric with the axis of said valve and comprising a support, a weighted lever pivotally secured to said support, a weight pivotally secured to said support, means normally holding said lever and weight together, said means being yieldable for limited separation of said lever and said weight, whereby parts of said lever and said weight may move outwardly under centrifugal force with said weight leading said lever, said lever being arranged to apply a force to said valve to move said valve toward a position to increase the pressure delivered to said control line with rise in speed of rotation of said flyweight mechanism, a pressure chamber in said casing subject to pressure in said control line for applying to said valve a counter force opposing the force applied to said valve by said flyweight mechanism, said counter force being operative during a part of the range of rotation of said mechanism to cause separation of said weight and said lever, and a stop for arresting outward movement of said weight, said weight when arrested serving as a stop to arrest outward movement of said lever.

5. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a flyweight mechanism secured to said sleeve to rotate therewith and comprising a support, a weighted lever pivotally secured to said support, a weight pivotally secured to said support, means for transferring force from said weight to said lever, said means being biased to hold said weight and lever together and being yieldable for limited separation thereof, said lever being arranged to apply a force to said valve to move said valve toward a position to increase the pressure delivered to said control line with rise in speed of rotation of said flyweight mechanism, and a pressure chamber in said sleeve subject to pressure in said control line for applying to said valve a force opposing the force applied to said valve by said flyweight mechanism.

6. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a driven member secured to one end of said sleeve, a flyweight mechanism secured to the other end of said sleeve to rotate therewith and comprising a support, a weighted lever pivotally secured to said support, a weight pivotally secured to said support, means for transferring force from said weight to said lever, said means being biased to hold said weight and lever together and being yieldable for limited separation thereof, said lever being arranged to apply a force to said valve to move said valve toward a position to increase the pressure delivered to said control line with rise in speed of rotation of said flyweight mechanism, a pressure chamber in said sleeve subject to pressure in said control line for applying to said valve a force opposing the force applied to said valve by said flyweight mechanism, driving of said driven member creating a force to move said sleeve longitudinally, a thrust bearing member for engaging a fixed member to limit said longitudinal movement, and a thrust bearing member attached to said support for engaging a part of said housing to limit longitudinal movement in the other direction.

7. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a driven member secured to one end of said sleeve, a flyweight mechanism secured to the other end of said sleeve to rotate therewith and being arranged to apply a force to said valve to move said valve toward a position to increase the pressure delivered to said control line with rise in speed of rotation of said flyweight mechanism, a pressure chamber in said sleeve subject to pressure in said control line for applying to said valve a force opposing the force applied to said valve by said flyweight mechanism, driving of said driven member creating a force to move said sleeve longitudinally in one direction, a thrust bearing member on said gear for engaging a fixed member to limit said longitudinal movement, and a thrust bearing member attached to said support for engaging a part of said housing to limit longitudinal movement in the other direction.

8. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a driven spiral gear secured to one end of said sleeve, a flyweight mechanism secured to the other end of said sleeve to rotate therewith and comprising a support, a weighted lever pivotally secured to said support, a weight pivotally secured to said support, means for transferring force from said weight to said lever, said means being biased to hold said weight and lever together and being yieldable for limited separation thereof, said lever being arranged to apply a force to said valve to move said valve toward a position to increase the pressure delivered to said control line with rise in speed of rotation of said flyweight mechanism, a pressure chamber in said sleeve subject to pressure in said control line for applying to said valve a force opposing the force applied to said valve by said flyweight mechanism, driving of said spiral gear creating a force to move said sleeve longitudinally in one direction, a thrust bearing member on said gear for engaging a fixed member to limit said longitudinal movement, and a thrust bearing member attached to said support for engaging a part of said housing to limit longitudinal movement in the other direction.

9. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a driven spiral gear secured to one end of said sleeve, a flyweight mechanism secured to the other end of said sleeve to rotate therewith and being arranged to apply a force to said valve to move said valve toward a position to increase the pressure delivered to said control line with rise in speed of rotation of said flyweight mechanism, a pressure chamber in said sleeve subject to pressure in said control line for applying to said valve a force opposing the force applied to said valve by said flyweight mechanism, driving of said spiral gear creating a force to move said sleeve longitudinally in one direction, a thrust bearing member on said gear for engaging a fixed member to limit said longitudinal movement, and a thrust bearing member attached to said support for engaging a part of said housing to limit longitudinal movement in the other direction.

10. A governor for delivering a variable pressure from a fluid pressure supply line to a control line comprising a ported casing, a ported sleeve rotatable in said casing, a pressure determining valve in said sleeve operative to deliver a variable pressure from said supply line to said control line, a flyweight mechanism secured to said sleeve to rotate therewith and comprising a support, a weighted lever pivotally secured to said support, a weight pivotally secured to said support, means for transferring force from said weight to said lever, said means being biased to hold said weight and lever together and being yieldable for limited separation thereof, said lever being arranged to apply a force to said valve to move said valve toward a position to increase the pressure delivered to said control line with rise in speed of rotation of said flyweight mechanism, and a pressure chamber in said sleeve subject to pressure in said control line for applying to said valve a counter force opposing the force applied to said valve by said flyweight mechanism, said counter force serving to cause separation of said lever and weight whereby said weight may move outwardly under centrifugal force away from said lever during a part of the range of rotation of the mechanism with the weight leading the lever.

11. In a governor as described in claim 10 the improvement which comprises a stop for arresting outward movement of said weight, said weight when arrested acting as a stop for arresting outward movement of said lever.

12. In a governor as described in claim 10 the improvement which comprises said support having a formation lying in the path of outward movement of said weight to arrest said movement, said weight when arrested acting as a stop to arrest outward movement of said lever.

References Cited in the file of this patent

UNITED STATES PATENTS

| | | |
|---|---|---|
| 829,908 | Bush | Aug. 28, 1906 |
| 1,205,127 | Herr | Nov. 14, 1916 |
| 2,116,385 | Collingham | May 3, 1938 |
| 2,247,492 | Hale | July 1, 1941 |
| 2,364,817 | Reggio | Dec. 12, 1944 |